Sept. 27, 1966 J. B. GODSHALK 3,275,026
POULTRY WATERING VALVES
Filed April 17, 1964

INVENTOR
James B. Godshalk

BY *Arnold & Roylance*

ATTORNEYS

United States Patent Office 3,275,026
Patented Sept. 27, 1966

3,275,026
POULTRY WATERING VALVES
James B. Godshalk, Chester Springs, Pa., assignor to Fox Products Company, Philadelphia, Pa., a corporation of Pennsylvania
Filed Apr. 17, 1964, Ser. No. 360,599
5 Claims. (Cl. 137—408)

This invention relates to automatic poultry watering valves and, more particularly, to valves of the general type disclosed in United States Patent 3,034,481, issued to me on May 15, 1962, and in my copending application Ser. No. 227,310, filed Oct. 1, 1962, now Patent No. 3,132,664. Valves of this type differ from prior-art devices in that, instead of being mounted on a rigid support separate from the trough or other watering receptacle, the valve is affixed directly to the trough and the combination of the trough and the valve is supported in part via the operating lever of the valve.

A general object of the invention is to provide such a valve which can be economically produced and requires less metal than have similar devices heretofore employed.

Another object is to provide such a valve capable of being mounted on a upright wall of the watering receptacle and in which the length of the valve body, and therefore the amount of solid metal required, need not be increased to allow an increase in the length of the operating lever.

A further object is to devise a valve of the type described wherein the valve body extends horizontally and both the operating lever and the spring employed to bias the lever extend generally parallel to the valve body.

In order that the manner in which these and other objects are achieved in accordance with the invention can be understood in detail, one particularly advantageous embodiment of the invention will be described with reference to the accompanying drawings, which form a part of this specification, and wherein.

Figure 1:
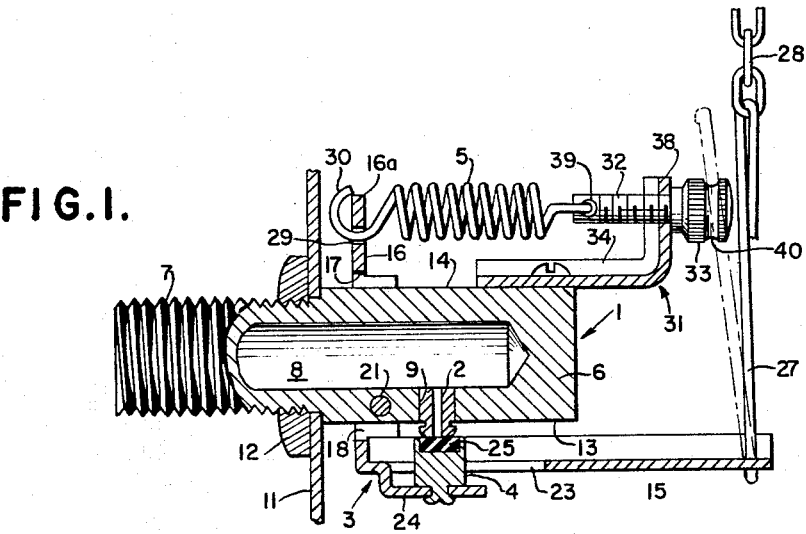
FIG. 1 is a side view, partially in vertical longitudinal section and partially in elevation, of a valve constructed in accordance with the invention.

Referring now to the drawings in detail, the embodiment of the invention here illustrated comprises a valve body 1 carrying a fixed valve element 2, an operating lever 3 pivoted to the valve body and carrying a movable valve element 4, and a tension spring 5 connected between the operating lever and the valve body in such fashion as to bias the valve to open condition.

Body 1 includes a main portion 6 of square transverse cross section, and an exteriorly threaded portion 7. A water-admitting bore 8 extends completely through threaded portion 7 of the body and terminates within main portion 6. A lateral bore 9 of smaller diameter is provided in one side of portion 6 and communicates with bore 8, the lateral bore accommodating fixed valve element 2. Typically, body 1 can be fabricated from brass rod of square cross section and the fixed valve element 2 can be a generally cylindrical stainless steel insert forcefitted in lateral bore 9.

Figure 2:
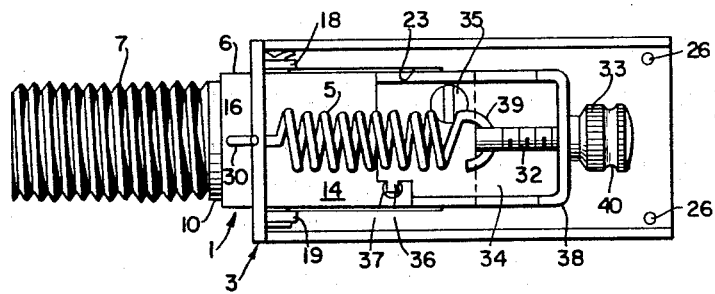
FIG. 2 is a top plan view of the valve shown in FIG. 1.
Figure 4:
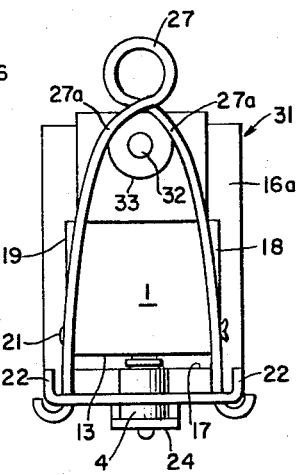
FIG. 4 is an end elevational view of the valve of FIG. 1.

Threaded portion 7 of the valve body joins the main portion 6 at a transverse shoulder 10, FIG. 2, which faces the free end of portion 7. When the valve is mounted on a watering trough or the like, the portion 7 is inserted through a suitable circular opening in an upright wall 11 of the trough and a clamping nut 12 is then threaded on portion 7 so that the wall 11 is clamped between nut 12 and shoulder 10 and the valve is rigidly affixed to wall 11. A suitable flexible water supply conduit, not shown, can then be fitted over the free end of portion 7 and secured thereto to provide water under pressure to bore 8.

In mounting the valve on the upright wall 11, care is taken to assure that surface 13 of main portion 6 of the body faces downwardly, while surface 14 of the portion 6 faces upwardly. Accordingly, the bore of fixed valve element 2 is directed downwardly so that, when water is discharged therefrom, it will escape directly into the trough.

Figure 3:
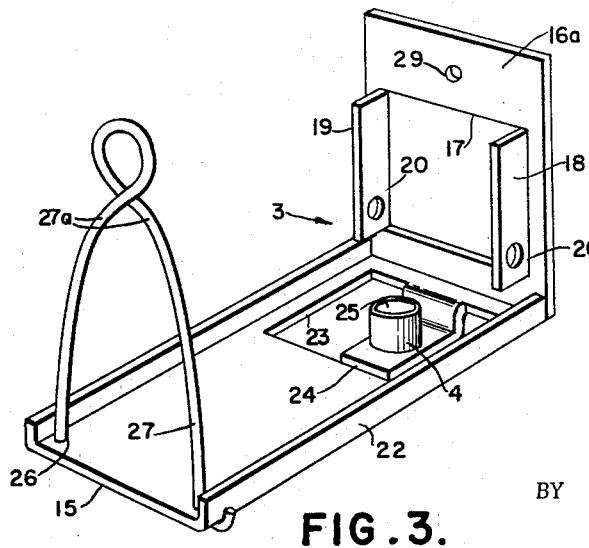
FIG. 3 is a perspective view of the operating lever employed in the device of FIG. 1.

Actuating lever 3 is generally L-shaped, including an arm 15 which projects generally parallel to the longitudinal axis of body 1, and an arm 16 which extends transversely of body 1 and is provided with a rectangular opening 17 freely accommodating body 1. Lever 3 is formed as an integral unit from stiff sheet metal stock. Arm 16 is flat, but is provided with a pair of flanges 18 and 19 each extending along a different side of opening 17 and each disposed at a different side of portion 6 of body 1. As will be evident from FIG. 3, the flanges 18 and 19 are formed from the material originally within the opening 17. Flanges 18 and 19 are provided with aligned openings 20 which accommodate a suitable bearing pin 21 extending through a transverse bore in the lower portion of body 1. Thus, the flanges 18 and 19, with openings 20, cooperate with bearing pin 21 to provide a pivotal mounting for lever 3, establishing a pivotal axis which extends transversely of the valve body.

Arm 15 has turned up side flanges 22 to assure stiffness of the arm and is provided with a rectangular opening 23 disposed below the fixed element 2. Formed integrally with arm 15 is a supporting tongue 24 which is offset from the plane of the body of arm 15 so as to lie parallel thereto and be spaced therebelow. The movable valve element 4 is secured to tongue 24, as by staking, and projects from the tongue toward the valve body. Element 4 is of cylindrical metal stock and recessed at its tip to accommodate a sealing gasket 25 disposed to come into flush engagement with the exposed tip of fixed valve element 2 when lever 3 is pivoted in a direction to swing arm 15 toward the valve body.

Adjacent its free end, arm 15 is provided with spaced openings 26 through which the hooked ends of a bail 27 extend. Bail 27 extends through one length of a suspension chain 28, the arrangement thus being such that the combination of the watering trough and the valve can be supported in part by the suspension chain via the lever 3.

Arm 16 of lever 3 includes a portion 16a projecting well above the valve body and provided with an opening 29 through which one hooked end 30 of spring 5 is engaged. The opposite end of the spring 5 is adjustably fixed by means of a bracket indicated generally at 31, a threaded rod 32 and an adjusting nut 33.

Bracket 31 is L-shaped, including a flat leg portion 35 which is secured in face-to-face engagement with upper surface 14 of the main portion 6 of the valve body and projects well beyond the end of body portion 6 opposite shoulder 10. Bracket 31 is fixed to the valve body, as by means of a single mounting screw 35 and a lug 36, FIG. 2, which projects downwardly from leg 34 and is engaged in a suitable upwardly opening recess 37 in the valve body. The bracket also includes an upright leg 38 provided with an opening through which the threaded rod 32 extends. At one end, rod 32 is provided with a transverse bore which accommodates the remaining end 39 of spring 5. Nut 33 is threaded on the opposite end of rod 32, so as to engage the surface of leg 38 of the bracket which is directed away from lever arm 16.

Accordingly, it will be understood that, with valve body 1 fixedly secured to the upright wall 11 of the watering receptacle, and with the suspension chain 28 depending from the roof of the building in which the watering receptacle is located, for example, the combined weight of the watering receptacle, the water therein, and the valve will tend to pivot lever 3 to close the valve, aganist the biasing action of spring 5. When the amount of water in the receptacle falls below a predetermined level, this combined weight will be inadequate to overcome the biasing force of the spring, and the valve will open automatically to admit additional water, the valve then closing again automatically when the water reaches the predetermined level.

From FIG. 1, it will be seen that the length of the moment arm provided by portion 15 of lever 3 is not limited by the lengths of portion 6 of the valve body, nor need portion 6 of the valve body be elongated to accommodate the necessary length of biasing spring 5. Thus, both arm 15 of the lever and bracket 31 for securing the biasing spring project well beyond the end of the valve body.

In order to provide means for latching the valve in closed position, the adjusting screw 33 is provided with a peripheral groove 40, and the bail 27 is twisted upon itself so that it extends in the form of a closed loop above the location of the adjusting screw. Portions 27a of the bail, immediately adjacent the closed loop, are curved to conform generally to the peripheral groove 40 in the adjusting nut. Accordingly, when it is desired to latch the valve in closed position, the bail 27 is simply swung toward wall 11 and portions 27a of the bail are snapped into engagement in groove 40 in the adjusting nut, the length of the legs of the bail being such that, when the bail is thus engaged with the adjusting nut, the lever 3 is held in a position forcing sealing gasket 25 in firm engagement with the tip of fixed valve element 2.

Though one particularly advantageous embodiment of the invention has been chosen for illustrative purposes, it will be understood by those skilled in the art that various changes and modifications can be made therein, without departing from the scope of the invention as defined in the appended claims.

What is claimed is:
1. In a poultry watering valve of the type described, the combination of
   an elongated valve body having
      a transverse shoulder intermediate its ends and facing one end of said body,
      a longitudinal bore opening through said one end, and
      a lateral opening communicating with said bore and located between said shoulder and the other end of said body;
   fastener means engageable over said one end of said body to cooperate with said shoulder for securing said body to an upright wall member of a watering receptacle,
      said body extending generally horizontally when so secured and said lateral opening then being directed downwardly;
   a rigid operating lever comprising first and second arms,
      said first arm extending generally transversely of said body between said shoulder and said lateral outlet and having an end portion above said body and another portion below said body,
      said second arm extending beneath said body from said other portion of said first arm and terminating in a free end projecting beyond said other end of said valve body,
         said free end being equipped with means for attachment to a suspension member for supporting the combination of the watering receptacle and valve via said lever;
   pivot means engaged with said first arm and said body and mounting said lever on said body for pivotal movement about a horizontal axis extending transversely of said body;
   a fixed valve element carried by said body at said lateral opening and having an orifice disposed to discharge water downwardly into the receptacle;
   a movable valve element carried by said second arm of said lever and projecting upwardly toward said body,
      said movable valve element being so located as to engage said fixed valve element and close the valve when said second arm of said lever swings upwardly toward said body;
   fixed bracket means secured to said body and having an upright portion spaced from said end portion of said first arm in the direction of said other end of said body; and
   a tension spring onnected between said upright portion of said bracket means and said end portion of said first arm of said lever,
      said spring extending generally parallel to and above said body and biasing said lever in a direction tending to swing said second arm downwardly away from said body.

2. A valve in accordance with claim 1 and wherein said first arm is flat and lies in a plane transverse to said body,
   said first arm being materially wider than said body and having an opening through which said body freely extends.

3. A valve in accordance with claim 2 and wherein said first arm of said lever is provided with spaced, parallel flanges disposed each on a different side of said opening, and
   said pivot means is engaged with said flanges.

4. A valve in accordance with claim 3 and wherein said opening is rectangular and said flanges define opposite sides of said opening and are disposed each closely adjacent to a different side of said body.

5. A valve in accordance with claim 1 and wherein said valve body has a flat top surface extending between said shoulder and said other end, and
   said bracket means includes a bracket member of generally L-shaped configuration,
      one leg of the L of said bracket being secured to said flat top surface and projecting beyond said other end of said body,
      the other leg of the L of said bracket projecting upwardly from said one end at a point spaced from said other end of said body on the side thereof opposite said shoulder,
   the distance between said shoulder and said other leg of the L of said bracket being substantially greater than the distance between said shoulder and said other end of said body.

References Cited by the Examiner

UNITED STATES PATENTS

| | | | |
|---|---|---|---|
| 2,619,123 | 11/1952 | Martin | 137—408 X |
| 2,629,396 | 2/1953 | Toadvine | 137—408 |
| 3,034,481 | 5/1962 | Godshalk | 119—81 |

WILLIAM F. O'DEA, *Primary Examiner.*

D. MATTHEWS, *Assistant Examiner.*